United States Patent
Sologuren-Sanchez et al.

(10) Patent No.: US 8,552,297 B2
(45) Date of Patent: Oct. 8, 2013

(54) INSULATION SPACER FOR A GAS INSULATED DEVICE AND METHOD OF PRODUCING SAME

(75) Inventors: Diego Sologuren-Sanchez, Wettingen (CH); Markus Keller, Zurich (CH)

(73) Assignee: ABB Technology AG, Zurich (CH)

( * ) Notice: Subject to any disclaimer, the term of this patent is extended or adjusted under 35 U.S.C. 154(b) by 414 days.

(21) Appl. No.: 12/832,486

(22) Filed: Jul. 8, 2010

(65) Prior Publication Data
US 2011/0005809 A1    Jan. 13, 2011

(30) Foreign Application Priority Data
Jul. 9, 2009   (EP) ..................................... 09165015

(51) Int. Cl.
*H01B 17/14*    (2006.01)
(52) U.S. Cl.
USPC ................... 174/137 R; 174/138 R; 174/168; 361/618
(58) Field of Classification Search
USPC .......... 174/168, 137 R, 138 R, 158 R, 161 R; 361/612, 618; 29/537.1, 887; 218/155
See application file for complete search history.

(56) References Cited

U.S. PATENT DOCUMENTS

| 3,898,367 A |   | 8/1975 | Nakata |
| 4,496,789 A | * | 1/1985 | Itaka et al. .................. 174/22 C |
| 5,089,665 A |   | 2/1992 | Thuries |
| 5,416,266 A | * | 5/1995 | Muller ......................... 174/21 C |
| 5,723,814 A | * | 3/1998 | Kolbl et al. ................. 174/31 R |
| 6,002,085 A | * | 12/1999 | Utsumi et al. ................. 174/28 |

FOREIGN PATENT DOCUMENTS

| DE | 19916392 A1 | 10/2000 |
| JP | 57090327 U | 6/1982 |

OTHER PUBLICATIONS

European Search Report for EP 09165015 dated Dec. 28, 2009.

* cited by examiner

*Primary Examiner* — Jinhee Lee
*Assistant Examiner* — Dimary Lopez
(74) *Attorney, Agent, or Firm* — Buchanan Ingersoll & Rooney PC

(57) ABSTRACT

An insulation spacer for a gas insulated device includes an insulator disc and an armature extending around an outer periphery of the insulator disc and holding the same. The armature is ring-shaped defining a ring axis and includes two ring base surfaces extending substantially perpendicularly to the ring axis; and a ring inner surface being arranged between the two ring base surfaces and facing the ring axis. Further, the ring inner surface includes at least one protrusion directed radially inwardly towards the ring axis, the at least one protrusion being shaped such that it locks the insulator disc in the armature against movement in both directions parallel to the ring axis.

16 Claims, 5 Drawing Sheets

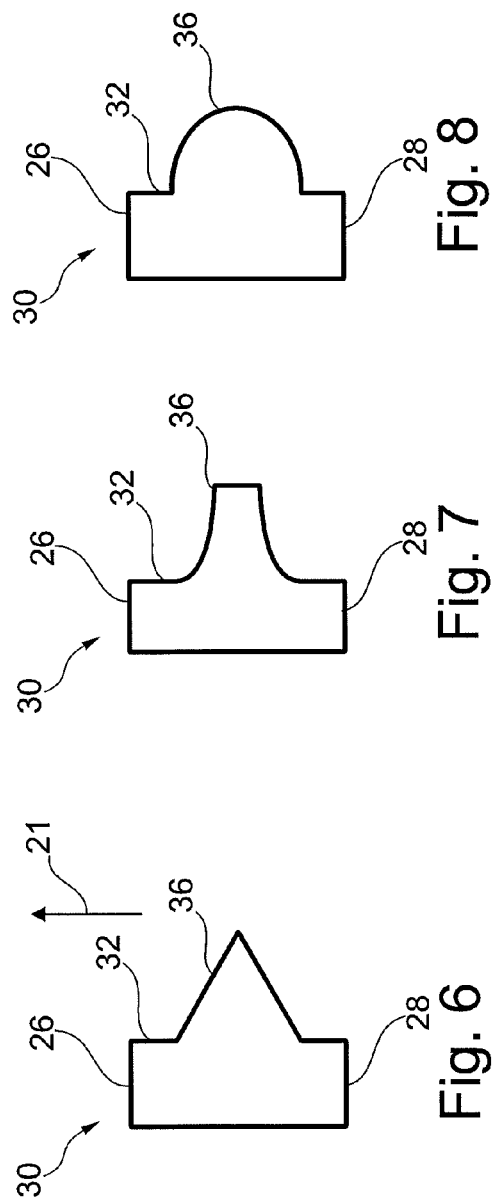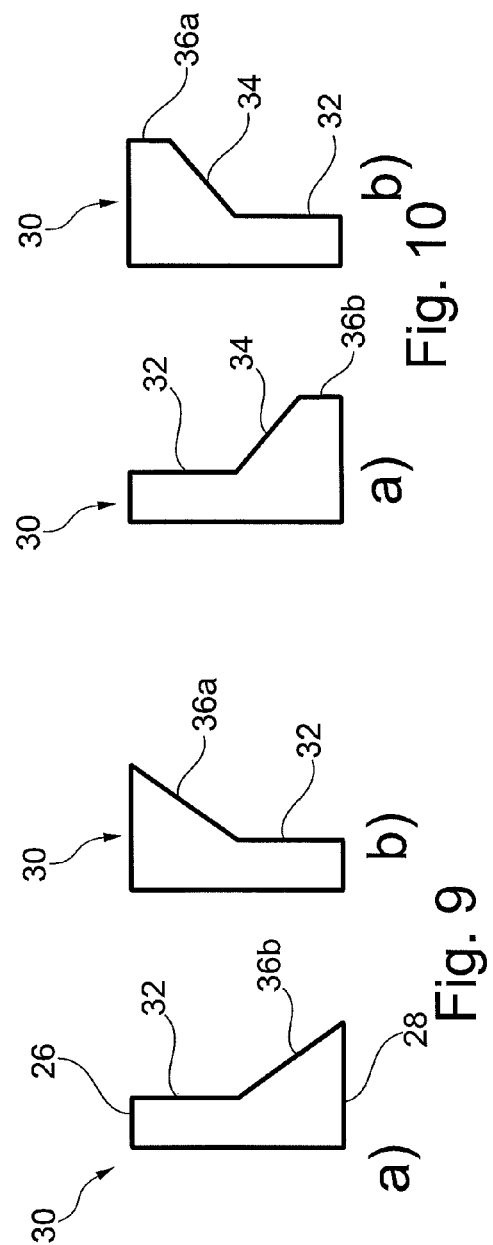

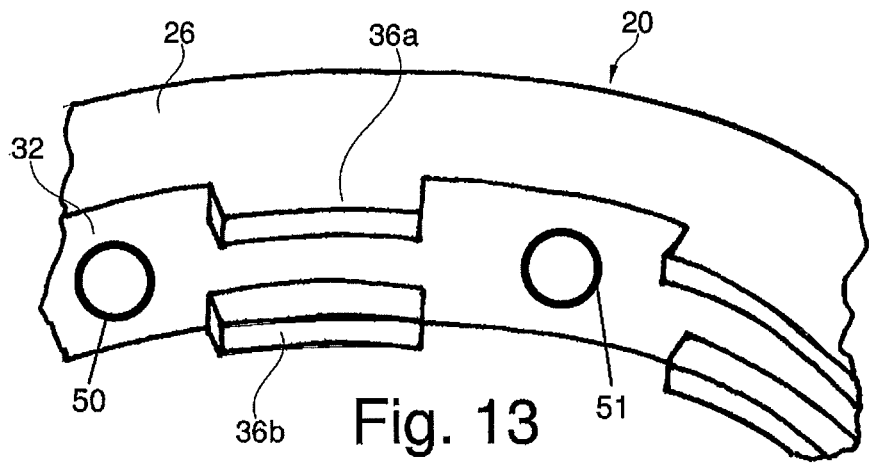
Fig. 13
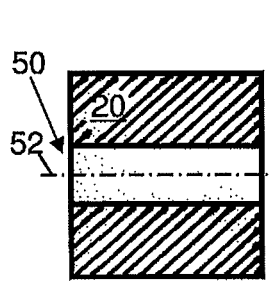 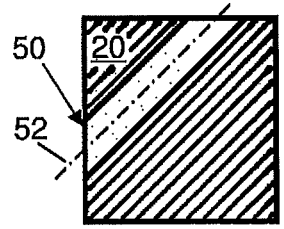 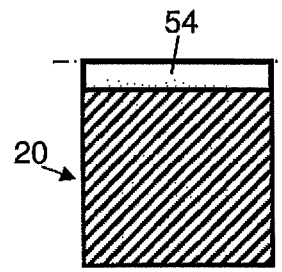
Fig. 14a  Fig. 14b  Fig. 14c
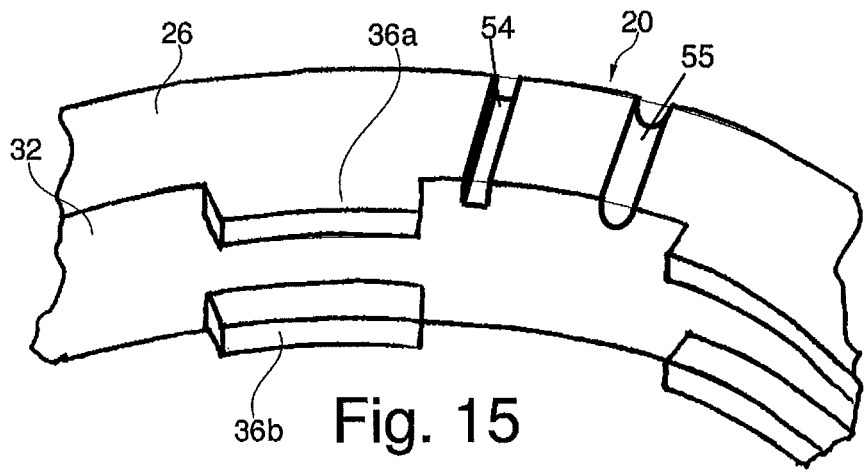
Fig. 15

INSULATION SPACER FOR A GAS INSULATED DEVICE AND METHOD OF PRODUCING SAME

RELATED APPLICATION

This application claims priority under 35 U.S.C. §119 to European Patent Application No. 09165015.0 filed in Europe on Jul. 9, 2009, the entire content of which is hereby incorporated by reference in its entirety.

FIELD

The disclosure relates to an insulation spacer for a gas insulated device, for example, to an insulation spacer including an insulator disc and an outer armature, to a gas insulated device including such an insulation spacer, and to methods of producing such an insulation spacer.

BACKGROUND INFORMATION

A gas-insulated switchgear (GIS) can accommodates high-voltage conductors, such as lead conductors to which a high voltage can be applied. To shield and insulate a high-voltage conductor from other components and from the outside, such an apparatus can include a grounded metal enclosure filled with an insulating gas, for example, a dielectric gas such as SF6.

An insulation spacer can be provided inside a GIS enclosure to hold high-voltage conductors firmly inside the device volume, in a position sufficiently far away from the grounded enclosure to avoid dielectric breakdowns. The insulation spacer can be secured at its outer edge to the enclosure, and has openings for accommodating the high-voltage conductors. A main portion of the spacer can be an insulator disc, with the openings at its center. Some spacers can have a metal armature ring attached to the outer circumference of the insulator disc. The armature ring can have attachment means such as threaded holes, which allow the insulator disc to be attached to the GIS enclosure.

Due to large size and mass, it can be difficult to assemble the armature ring and the insulator disc to form a spacer of sufficiently high stability and precise geometry. It is desirable to have the insulator disc held firmly in the armature ring. To this purpose, some armature rings have two protruding bands at their inner surface (i.e. at the surface directed towards the ring axis and by which the insulator disc is held). The protruding bands run circumferentially around the ring at its inner surface, and the insulator disc can be held between the protruding bands.

Such armatures can be produced by for example, methods such as sand casting. With this method, a part of the casting mold is destroyed when the armature ring is taken out of the mold. Alternatively, the ring inner surface can be milled after casting of the ring. Alternatively, the ring can be cast as several parts, which are assembled after casting. However, these production methods can be costly. Also, it can be difficult to achieve sufficiently low tolerances using these production methods. When the tolerances are too high, however, there can be a risk of stray fields within the GIS, of gas leakage out of the GIS enclosure, so that there is a risk that the lifetime and reliability of the GIS switch may be reduced.

SUMMARY

An insulation spacer for a gas insulated device is disclosed, including an insulator disc; and an armature extending around an outer periphery of the insulator disc and holding the insulator disc, wherein the armature is ring-shaped defining a ring axis and comprises two ring base surfaces extending substantially perpendicularly to the ring axis; and a ring inner surface being arranged between the two ring base surfaces and facing the ring axis, wherein the ring inner surface includes at least one protrusion directed radially inwardly towards the ring axis, the at least one protrusion being shaped such that it locks the insulator disc in the armature against unintentional movement in both directions parallel to the ring axis, and wherein the ring inner surface including the protrusion is shaped such that for any point of the ring inner surface, there is a path along the ring inner surface from the point to one of the two ring base surfaces, the path being monotonically directed away from the ring axis and being a direct path entirely within a cross-sectional plane containing the ring axis, or an indirect path including of a first path portion of predetermined length in a circumferential direction, followed by a second path portion entirely within a cross-sectional plane containing the ring axis, and wherein the ring inner surface is shaped such that the insulator disc is locked in the armature against rotational movement in at least one circumferential direction relative to the ring axis.

An insulation spacer for a gas insulated device is disclosed, comprising an insulator disc; and an armature extending around an outer periphery of the insulator disc and holding the insulator disc, wherein the armature is ring-shaped defining a ring axis and comprises two ring base surfaces extending essentially perpendicularly to the ring axis; and a ring inner surface being arranged between the two ring base surfaces and facing the ring axis, wherein the ring inner surface includes at least one protrusion directed radially inwardly towards the ring axis, the at least one protrusion being shaped such that it locks the insulator disc in the armature against unintentional movement in both directions parallel to the ring axis, and wherein the ring inner surface including the protrusion is shaped such that any cross-sectional profile of the ring inner surface is substantially free of any inner recess directed radially away from the ring axis, and wherein the ring inner surface is shaped such that the insulator disc is locked in the armature against rotational movement in at least one circumferential direction relative to the ring axis.

A method of producing an insulation spacer for a gas insulated device is disclosed, the method comprising providing a ring-shaped armature defining a ring axis and having a ring inner surface facing the ring axis, the ring inner surface including at least one protrusion directed radially inwardly towards the ring axis positioning the armature in a first molding cavity of a molding machine such that a second molding cavity is formed, the second molding cavity surface including the ring inner surface molding an insulator disc by bringing an insulation material into the second cavity and by curing said insulating material such that the armature holds the insulator disc therein thus forming the insulation spacer; and demolding the insulation spacer from the molding machine.

BRIEF DESCRIPTION OF THE FIGURES

The disclosure will be described in greater detail by reference to exemplary embodiments and the figures, wherein;

FIG. 6-8 are cross-sectional side views of armature rings of insulation spacers according to a third, fourth, and fifth exemplary embodiment, respectively;

FIGS. 9a, 9b and 10a, 10b are cross-sectional side views of armature rings of insulation spacers according to a sixth and seventh exemplary embodiment, respectively;

FIG. 13 is a perspective view of a portion of an armature ring of an insulation spacer according to a ninth exemplary embodiment having a through channel;

FIGS. 14a to 14c are cross-sectional side views of respective through-channels; and FIG. 15 is a perspective view of a portion of an armature ring of an insulation spacer according to a tenth exemplary embodiment having a through channel.

DETAILED DESCRIPTION

Figure 1:
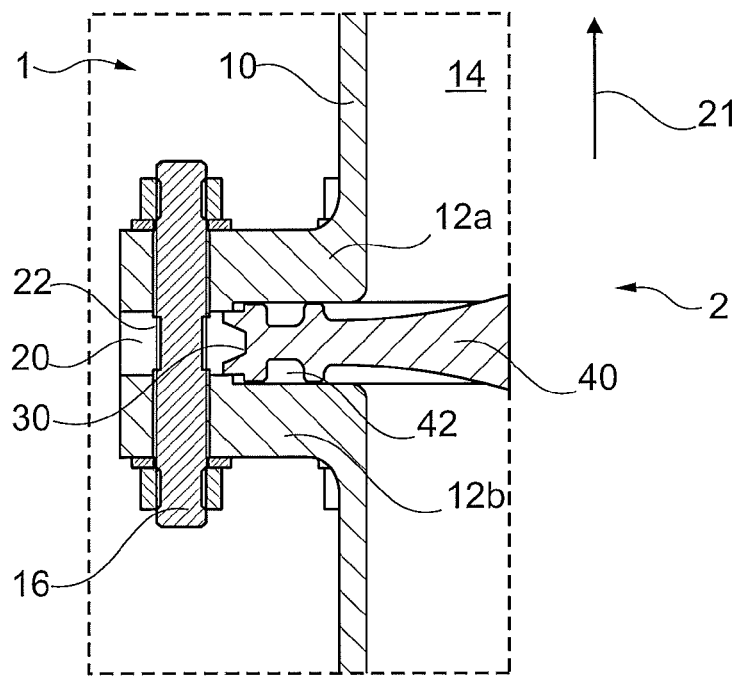
FIG. 1 is a cross-sectional side view of a portion of an insulation spacer according to a first exemplary embodiment.

According to the disclosure, an insulation spacer for a gas insulated device can be provided. The insulation spacer includes an insulator disc and an armature extending around an outer periphery of the insulator disc and holding the insulator disc. The armature can be ring-shaped defining a ring axis and can include two ring base surfaces which can extend substantially perpendicularly to the ring axis, and a ring inner surface arranged between the two ring base surfaces and facing the ring axis.

The ring inner surface can include at least one protrusion directed radially inwardly towards the ring axis. The at least one protrusion can be shaped such that it can lock the insulator disc in the armature against movement in both directions parallel to the ring axis. When the at least one protrusion is a plurality of protrusions, this locking can result from the shape of the plurality of protrusions, not only of one protrusion.

The ring inner surface including the at least one protrusion can be shaped such that for any point of the ring inner surface, there can be a path along the ring inner surface from the point to one of the two ring base surfaces, the path being monotonically directed away from the ring axis. The path can be a direct path entirely within a cross-sectional plane containing the ring axis, or an indirect path including a first path portion of predetermined length in a circumferential direction, followed by a second path portion entirely within a cross-sectional plane containing the ring axis.

Here, the predetermined length means that the first path portion can have a length corresponding to a predetermined angle α around the ring axis. The angle α can be independent of the respective point under consideration. The ring axis can be the central axis of the ring. The base surface can generally be approximately flat but it can contain non-even portions such as channels along the base surface.

The phrase "monotonically directed away from the ring axis" means that for each section of the path, the distance from the ring axis can stay the same or increase, but does not decrease. The path is directed from the point under consideration to the respective ring base surface. Here, the term "monotonically" can be distinguished from the more narrow term "strictly monotonically." "Monotonically directed away from the axis" includes the case that in some path section(s) the distance from the ring axis is constant. Even the entire path can have a constant distance from the ring axis (at least for some points, as long as the ring inner surface has a protrusion).

Thus, the path includes, in the case of a direct path, an axial path portion that runs entirely within a plane containing the ring axis and ends at the respective one of the two ring base surfaces.

In the case of an indirect path, the path includes an axis-normal path portion, followed by an axial path portion as described above. The axis-normal path portion begins at the respective point and runs entirely within the plane normal to the ring axis.

In the case that there is a direct path for any point of the ring inner surface, the shape of the ring inner surface can be described as follows. Any cross-sectional profile of the ring inner surface can be essentially free of any inner recess directed radially away from the ring axis. Here, the cross-sectional profile can refer to the profile in a cross-sectional plane containing the ring axis. For example, in this case each point of the cross-sectional profile can have a path to at least one of the two ring base surfaces along the cross-sectional profile, the path being monotonically directed away from the ring axis.

In the following, some exemplary embodiments will be described.

According to some exemplary embodiments, the ring inner surface can be shaped such that the insulator disc can be locked in the armature against rotational movement in at least one circumferential direction relative to the ring axis, and in other exemplary embodiments against movement in both circumferential directions. In particular, the armature can include at least ring sectors of a first type and ring sectors of a second type. The ring sectors of first type can have an inner sector surface (i.e., a cross-sectional surface profile) different from that of the ring sectors of second type, for example, with an extra protrusion or recess. In various exemplary embodiments, the sectors can alternate between the first and second type.

According to some exemplary embodiments, the ring inner surface can hold the insulator disc by positive fit within the armature, i.e. the locking described above is a locking by positive fit.

According to some exemplary embodiments, the protrusion can be separated from each of the two ring base surfaces by a respective recessed surface portion arranged between the protrusion and the respective base surface. Here, "recessed surface" means that the surface can be farther away from the ring axis than at least a part of the protrusion. In various exemplary embodiments, each of the recessed portions can be at least partially flat, with the flat part being parallel to the ring axis.

According to some exemplary embodiments, the protrusion extend along a ring segment covering an angle of at least 15°, of at least 30°, of at least 60°, or even of at least 120° around the ring axis. The segment can even cover the entire ring circumference (360°).

According to some exemplary embodiments, the armature can include a single-piece ring body extending fully around the outer periphery of the insulator disc, around the entire ring circumference (360°). In particular, the armature can include the single-piece ring body.

A gas insulated device, for example, a gas insulated switchgear can include an insulation spacer as described above.

A method of producing an insulation spacer for a gas insulated device can be provided including a ring-shaped armature is provided that defines a ring axis and has a ring inner surface facing the ring axis. The ring inner surface can include at least one protrusion directed radially inwardly towards the ring axis. The armature can be positioned in a first molding cavity of a molding machine such that a second molding cavity can be formed. The second molding cavity surface can include the ring inner surface.

An insulator disc can be molded by bringing an insulation material into the second cavity and by curing the insulating material such that the armature can hold the insulator disc therein, thus forming the insulation spacer and the insulation spacer is demolded from the molding machine.

In particular exemplary embodiments, the method can include producing the insulation spacer as described in any of the other above aspects, or anywhere else in this application.

Reference will now be made in detail to the various exemplary embodiments, one or more examples of which are illustrated in each Figure. Each example is provided by way of explanation and is not meant as a limitation. For example, features illustrated or described as part of one embodiment can be used on or in conjunction with any other embodiment to yield yet a further embodiment. It is intended that the present disclosure includes such modifications and variations.

Within the following description of the drawings, the same reference numbers refer to the same or to similar components. Generally, only the differences with respect to the individual embodiments are described. Unless specified otherwise, the description of a part or aspect in one embodiment applies to a corresponding part or aspect in another embodiment as well.

FIG. 1 shows a part of a gas insulated switch gear 1 in a cross-sectional side view. The switch gear has, at least in the shown part, a roughly cylindrical shape about a cylinder axis. The axis is located outside of FIG. 1 but its direction is nevertheless indicated schematically by the arrow 21 therein. The interior volume 14 of the switch gear can be filled with a dielectric gas such as SF6. The switch gear 1 includes an enclosure 10, which can be air-tight to keep the insulating gas inside the device. The enclosure 10 can be made of metal or another conducting material to shield the outside from electromagnetic fields. The enclosure can be grounded.

The switch gear 1 can include a high-voltage conductor or a plurality of high-voltage conductors inside (not shown), which can be insulated from the enclosure. The switch gear 1 can include an insulation spacer 2, which is described in more detail herein below. The insulation spacer 2 can separate different gas-filled compartments of the interior volume 14 from one another, and hold the high-voltage conductors or conductors inside the device volume 14 in a defined position.

The insulation spacer 2 can be held between two flanges 12a and 12b of the enclosure 10. The insulation spacer 2 has an overall disc-like shape, with the disc axis being the axis 21 (represented by the arrow 21). The insulation spacer 2 can include an insulator disc 40 and an outer armature 20.

The insulator disc 40 can have at least one opening near its central region (not shown in FIG. 1) for accommodating the high voltage conductor(s) therein. The insulator disc 40 can be shaped as a circular disc with the axis 21 as its central axis.

The armature 20 can extend circumferentially around the insulator disc 40, so that the ring axis coincides with the axis 21 of the insulator disc 40. The armature 20 can be a single-piece ring body extending fully around the outer periphery of the insulator disc 40. The armature 20 can be firmly attached to the insulator disc 40 in a manner described in more detail below. The armature 20 can include an electrically conducting material, and in particular a metal.

The armature 20, and thereby the entire insulation spacer 2, can also be attached to the enclosure 10, between two flanges 12a and 12b of the enclosure 10. In more detail, the armature 20 can be fixed to the device enclosure 10 by threads 16, which extend through the upper flange 12a, the armature ring 20, and the lower flange 12b. To this purpose, thread holes 22 can be provided in regular angular intervals within the outer armature 20, and similar holes can be provided at corresponding positions in the flanges 12a and 12b.

Having the insulation spacer made of these two parts—the insulator disc 40 surrounded by the metal armature ring 20—can have a number of advantages. The interior part (here, the insulator disc 40) can be made insulating (possibly with a conducting outer sheet or a partial grounding such as to avoid static charges thereon), so that the desired insulating effect of the spacer can be achieved. The outer circumferential part (here, the armature 20) can be made conducting. This can allow the armature to carry currents sufficiently well so that the gas insulated switch gear enclosure 10 can provide an efficient shielding against charges, currents and electromagnetic fields inside the gas insulated switch gear. More generally, the outer armature 20 can be designed to match the properties of the enclosure 10, such that no thermal or electrical inhomogeneities are introduced.

As stated above, the shape of the insulation spacer 2 and especially of its outer armature 20 can have only small tolerances, generally much less than 1 mm. If the tolerances are too high, there can be a risk of gaps within the device enclosure 10 through which gas might leak, and, of surface irregularities which may result in electrical fields, charges or currents in the presence of the high operational voltages of the switch gear device. Manufacturing the insulation spacers—which can have considerable sizes—to such high precision can be difficult. This can be especially the case for the insulation spacer including two parts, i.e. of the insulator disc 40 and the outer armature 20. It is desirable for these parts to be joined stably and accurately.

As can be seen in FIG. 1, the insulator disc 40 can be held within the outer armature 20 by the inner ring surface 30 of the armature 20, the inner ring surface 30 contacting and fixing the insulator disc 40 by positive fit. Therefore, the shape of the inner surface 30 of the armature 20 plays role for holding the insulator disc 40.

Figure 2:
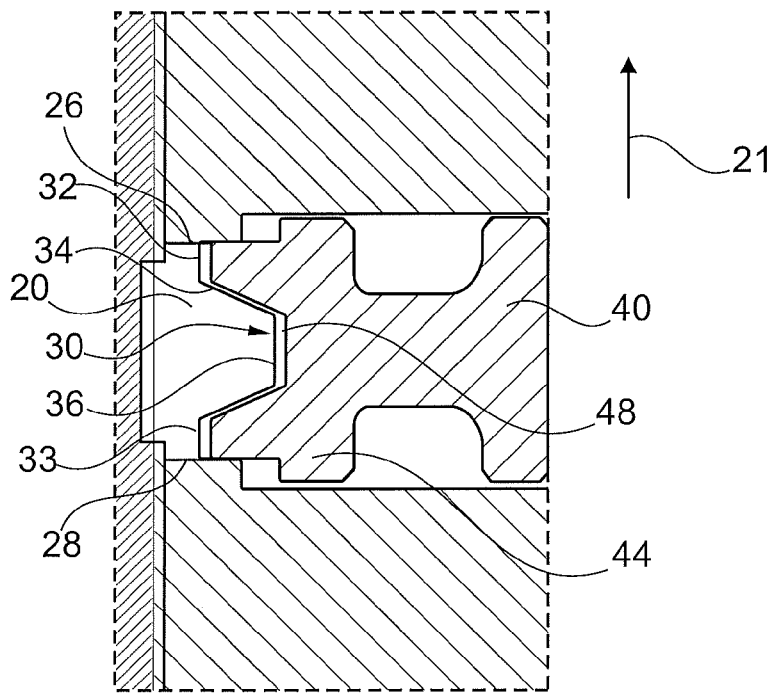
FIG. 2 is an enlarged portion of FIG. 1.

The shape of the inner surface 30 is more clearly shown in FIG. 2, which is an enlarged portion of FIG. 1 (and, hence, also a cross-section in a cross sectional plane containing the ring axis 21). As can be seen in FIG. 2, the ring-shaped outer armature 20 has an upper base surface 26 extending in a horizontal direction (i.e. orthogonally to the axis 21), a lower base surface 28 (opposite and parallel to the upper base surface 26), and the ring inner surface 30, mentioned above, arranged between the two base surfaces 26 and 28.

The profile of the ring interior surface 30 has a protrusion 36. The protrusion 36 has a flat central portion (protruding farthest outwardly towards the ring axis 21) and inclined side faces 34. Further, the profile has flat recess portions 32 and 33. The portion 32 can be arranged between the upper base surface 26 and the protrusion 36. The lower flat recessed surface 33 is can be arranged between the lower base surface 28 and the protrusion 36. The protrusion 36 can include at least one of a flat surface portion parallel to the ring axis 21 and an inclined surface portion 34 inclined at a skew angle with respect to the ring axis 21. The ring inner surface 30 can include a flat recessed portion 32, i.e. a portion recessed relative to the protrusion, wherein the recessed portion can be parallel to the ring axis 21.

The protrusion 36 can allow the insulator disc 40 to be held stably, such that it can be locked in the outer armature 20 against movement in directions parallel to the axis 21 (up and down in FIGS. 1 and 2). To this purpose, the outer surface of the insulator disc 40 contacting the inner surface 30 of the armature 20 can be shaped inversely to the inner surface 30, with a recessed portion corresponding to the protrusion 36 of the inner surface. This mutually inverse shape can result in a form-fit connection between the armature 20 and the insulator disc 40, locking these parts against movement in the direction parallel to the axis 21.

The profile of the armature inner surface 36 shown in FIGS. 1 and 2 can be free of any inner recess, for example, an inner recess that would be directed radially away from the ring axis and be surrounded, on both sides—up and down in FIG. 2—by a protrusion. A through hole is not considered to be a recess, because as the through hole traverses the armature completely, does not belong to its inner surface. This shape can allow the armature 20 to be manufactured by a permanent-mold casting process, such as die-casting or chill-casting. Specifically, the casting mold can include two parts, for example, one upper mold part corresponding to the upper half of the armature 20 body (i.e. the half comprising the upper base surface 26), and one lower mold part corresponding to the lower part of the armature 20 body (including the lower base surface 28). After casting, the armature can be unmolded by separating the upper and lower mold part from one another in the direction of the ring axis 21.

If the inner surface 36 had an inner recess, the above casting process may not be possible. Instead, such an inner recess can be formed by for example, sand casting or some other process in which the mold is partially destroyed, or by a very complex mold, or using some post-processing such as after-cast milling.

The cross-sectional surface profile of FIG. 2 can be described as follows. Each point of the cross-sectional profile can have a direct path to at least one of the two ring base surfaces, the path running along the cross-sectional profile, with the path being monotonically directed away from the ring axis. Here, for example, for any point in the upper half of FIG. 2, such a path can be directed from this point to the upper base surface 26. This path follows only some flat portions of the surface and the slope 34 (directed away from the ring axis 21 in the path direction), and is therefore indeed monotonically directed away from the ring axis. Similarly, for any point in the lower half of FIG. 2, such a path can be directed from this point to the lower base surface 28.

Thus, in the surface profile of FIG. 2, two types of points of can be distinguished. Points of an upper type (including the points of the flat recessed portion 32, of the upper inclined side face 34 and of the flat portion 36 of the protrusion) have a path as described above to the upper base surface 26. Points of a lower type have a path to the lower base surface 28. The points of the flat portion 36 belong to both types. Correspondingly, the points of the upper type can be cast by the upper casting mold, and the points of the lower type can be cast by the lower casting mold. Then, because the corresponding paths are directed monotonically away from the ring axis, the upper mold can be taken away vertically upwards, and the lower mold can be taken away vertically downwards easily and without restriction.

In an exemplary embodiment based on FIGS. 1 and 2, the interior surface 30 of the armature 20 can be axially symmetric with respect to the axis 21. In this embodiment, the insulator disc 40 can be locked against rotational movement around the axis 21 for example, by an adhesive connection or by additional threads.

In a further exemplary embodiment based on FIGS. 1 and 2, the interior surface 30 of the armature 20 can have at least one axially non-symmetric feature with respect to the axis 21. Such a feature may be an additional protrusion or recession in a sector of the outer armature ring 20, or a circumferential sector in which the protrusion 36 is interrupted. This axially non-symmetric feature locks the insulator disc 40 against rotational movement around the axis 21. The inner surface 30 can include a plurality of protrusions extending along respective ones of a plurality of ring segments.

Referring back to FIG. 1, the insulator disc 40 is described in more detail. The insulator disc 40 may not be of uniform thickness in the direction of the axis 21. Instead, its thickness can decrease from a radially inner area of higher thickness (not shown in FIGS. 1 and 2, with the openings for the high-voltage conductors provided therein), to a radially intermediate portion of lower thickness. Further, the insulator disc 40 can have a radially outer portion (within the region between the flanges 12a, 12b in FIG. 1) of, again, higher thickness.

The radially outer portion of higher thickness can be useful for holding the insulator disc 40 firmly in place. Specifically, the disc outer portion, and thereby the insulator disc 40 can be held in place by the inner surface 30 of the armature 20, as described above. The disc outer portion can also be pressed between the flanges 12a, 12b of the enclosure 10. Thereby, the fit with the armature 20 can be enhanced due to the inclined side faces 34 of the protrusion 36 of the armature. Due to these inclined side faces, the insulator disc 40 can also press against the inner surface 30 of the armature 20 when it is axially pressed by the flanges 12a and 12b. Thus, even if a small gap 48 should exist between the disc insulator 40 and the armature 20 (as shown in FIG. 2 and discussed further below), both parts can be firmly held against each other when inserted in the gas insulated switch gear 1.

Further, the radially outer portion of higher thickness can also be useful for providing a gas-tight seal between the interior of the GIS enclosure and the outside, and also between two neighbouring GIS sectors separated by the insulation spacer 2. In order to further enhance the seal, two sealing O-rings (not shown in FIG. 1) can be inserted into sealing ring grooves 42 which extend circumferentially on both sides at the outer portion of the insulator disc 40.

Thus, at least a portion of the insulator disc 40—for example, a radially outer portion—can be thicker than the armature ring 20 in an axial direction.

A method of producing the insulation spacer 2 shown in FIGS. 1 and 2 is described. First, the ring armature 20 can be manufactured by a permanent-mold casting process. As described above, such a process can be possible with the mold including two mold parts, due to the advantageous shape of the armature inner surface 30.

Then, the insulator disc 40 can be molded. Herein, the ring 20 can be used as part of the molding cavity. To this purpose, the armature 20 can be positioned in a first molding cavity of a molding machine such that a second molding cavity can be formed. The second molding cavity corresponds to the future shape of the insulator disc 40. Its surface includes the ring inner surface 30 as the molding cavity surface that defines the outer circumferential surface of the insulator disc 40. Then, the insulator disc 40 can be produced by a molding process in the second cavity. With this method, the insulator disc can be in the correct position, held and locked by the armature 20, directly after molding. After molding, the insulation spacer 2 can be produced and can be taken from the molding machine.

For molding the insulator disc 40 in the second molding cavity, the molding mass (for example, a dielectric resin) can be introduced into the second molding cavity via at least one mold inlet opening of the second molding cavity. The at least one mold inlet opening can be arranged at any part of the second molding cavity. In particular, the at least one mold inlet opening can be arranged at the inner surface of the armature ring. With this arrangement, at least one through-channel can be formed in the armature, so that an end of a through-channel is the mold inlet opening at the inner surface of the armature ring. The through-channel can be formed during casting of the armature ring, for example, by inserting a movable body into the first molding cavity. The shape of the movable body corresponds to the inverse shape of the through-channel. After molding the armature, the movable body can then be removed therefrom, leaving behind the through-channel. Alternatively, the through-channel can be formed after molding for example, by drilling a through-hole through the armature. If the through-channel is provided as a recess of the ring upper or lower base, its shape can be defined by the first molding shape.

The insulation material can then be brought into the second cavity via the at least one through-channel for molding the insulation disc. An armature with such through-channel is described in further detail below with reference to FIGS. 13 to 15. During the molding of the insulation disc, it is verified that the mold can flow freely within the molding cavity, unhindered by any gas within the cavity. To this purpose, gas is removed from the molding cavity either prior to molding and/or during molding.

For removing the gas prior to molding, the cavity may be put into an underpressurized or vacuum environment, for example in an autoclay. Also, the gas may be removed from just the molding cavity prior to molding, for example by pumping out the gas via the through channel.

Alternatively or additionally, it is possible to make sure that the gas displaced by the mold is capable of leaving the molding cavity during molding, for example via at least one gas outlet opening provided in the second molding cavity. Such a gas outlet opening can be provided at any part of the second molding cavity, especially at a part that is in a vertically top position. In particular, the gas outlet opening can be provided as the end of a through-channel extending through the armature ring. With these outlet openings, it can be possible to inject the mold via injection molding without the problem of having a pressurized gas remaining within the mold. Some insulating material can be left in the channel after molding, so that in the finished ring the channel is at least partially filled with insulating material.

The through channels allow radial injection of the insulating mold. This can allows for the outer disc portion of the insulating disc being particularly free of irregularities, and hence for excellent properties even at strong fields.

The first molding cavity can include two parts which can be moveably arranged relative to each other (i.e. at least one of the parts is movable against the other). The movement can be between a closed state (for molding, i.e. the first molding cavity is delimited in the closed state) and an open state (for example taking out the molded product). Optionally, further steps can follow, such as providing a weakly conductive surface to the insulator disc 40.

Figure 3:
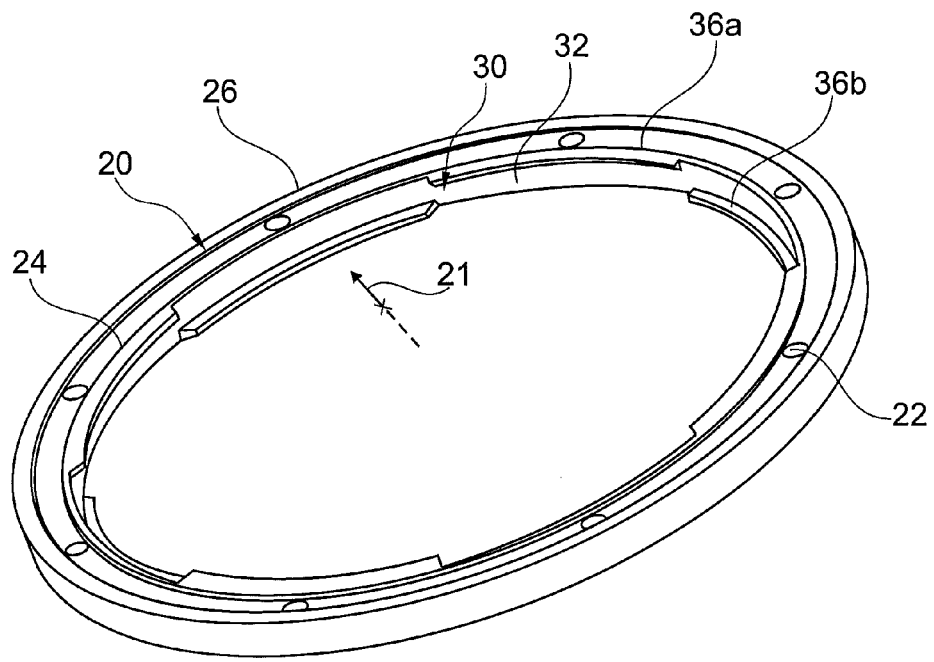
FIG. 3 is a perspective view of an armature ring of an insulation spacer according to a second exemplary embodiment.
Figure 4:
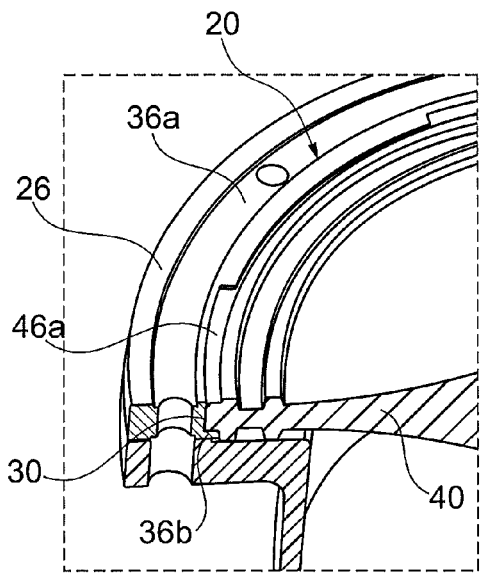
FIG. 4 is a perspective view of a portion of the insulation spacer according to the second exemplary embodiment with an insulator disc in the armature ring of FIG. 3.
Figure 5:
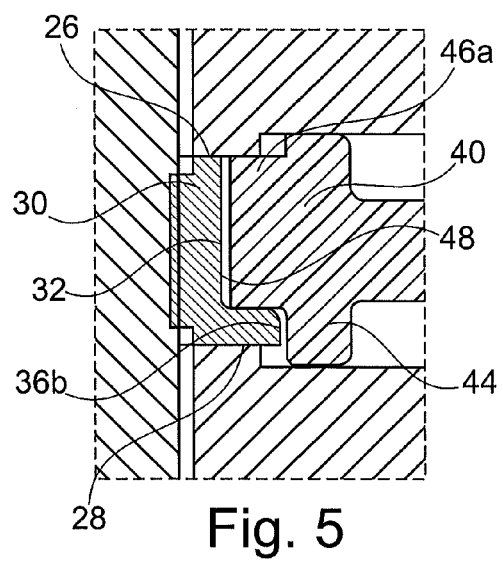
FIG. 5 is a cross-sectional side view of a portion of an insulation spacer according to the second exemplary embodiment.

The insulator disc 40 can be molded from for example, a dielectric resin. In this case, the insulator disc 40 generally shrinks a little during the molding process, both in an axial and in a radial direction. Because the extension of the insulator disc 40 is greater in the radial than in the axial direction, it generally shrinks more in the radial direction. Thus, a small gap 48 results between the armature ring 20 and the insulator disc 40 (see FIG. 2). The inclined surfaces 34 at the side of the protrusion 36 can still allow a good locking between the armature 20 and the insulator disc 40. With these inclined surfaces 34, these parts can still remain in contact even when the insulator disc 40 shrinks both axially and radially. Further, even if there remains a small gap in the region of the inclined surfaces 34, they allow the insulator disc 40 to be pressed against the armature 20 radially, thereby ensuring a firm contact between them. In the following, further embodiments are described. FIGS. 3 to 5 show different views of an insulation spacer according to a second exemplary embodiment. Therein, FIG. 3 is a perspective view of the ring-shaped outer armature 20 thereof. This armature 20 corresponds to the armature 20 of the embodiment of FIGS. 1 and 2, except that its inner surface 30 is shaped differently, as described below.

The inner surface 30 of the outer armature 20, shown in FIG. 3, has a recessed portion 32, and protrusions 36a and 36b. The protrusions 36a can be adjacent to the upper base surface 26, and the protrusions 36b can be adjacent to the lower base surface 28 (see FIG. 5). Each of the protrusions 36a and 36b can be arranged along a respective circumferential sector of the ring 20 about its axis 21. There can be eight such sectors in the armature of FIG. 3, each covering about the same angle about the ring axis 21, the angle being 45° (of the entire 360° of the ring). The inner surface 30 can have at least 4, or at least 6, or at least 8 sectors. It is desirable that the inner surface 30 has at most 20, or at most 12 sectors. The protrusion can extend along a ring segment covering an angle of at least 15°, of at least 30°, of at least 60°, or even of at least 120° around the ring axis. The segment can even cover the entire ring circumference (360°). The sectors with the protrusions 36a and the sector with the protrusions 36b can be arranged in alternating order along the ring circumference of the armature. Further the sections do not overlap, such that there is no cross section (in a plane containing the ring axis 21) which would have both protrusions 36a and 36b.

FIG. 4 shows a detail of the insulation spacer 2 having the outer armature 20 of FIG. 3, and an insulator disc 40 inserted therein. The insulator disc 40 can have an outer surface being the form-fit inverse of the inner surface 30 of the outer armature 20. Hence, the outer surface of the insulator disc 40 can have a recess portion where the inner surface of the outer armature 20 has a protrusion 36b, and the outer surface of the insulator disc 40 can otherwise extending outwards to contact with the armature's recessed portion 32. In particular, the insulator disc 40 can also have radially outer portions 46a extending to the upper base surface 26 of the armature ring 20, circumferentially between two protrusions 36a of the same type. Likewise, the insulator disc 40 also can have outer portions extending to the lower base surface.

FIG. 5 shows the insulation spacer 2 of FIGS. 3 and 4, in particular its interface between the armature 20 and the insulator disc 40, in more detail in a cross sectional side view. The view corresponds to that of FIG. 2, with like parts being given like reference numbers. Here in FIG. 5, the profile of the armature's inner surface 30 is different from that shown FIG. 2. In the profile of FIG. 5, the protrusion 36b is not arranged vertically in the middle of the armature's inner surface 30, but can instead be arranged at one side of the interior surface 30, specifically at the side adjacent to the lower base surface 28.

Consequently, the protrusion 36b can lock the insulator disc 40 against movement in an axial direction only when the movement is downward in FIG. 5, but it does not lock against movement of the insulator disc 40 in an upward direction relative to the armature ring 20. Nevertheless, the surface 30 shown in FIG. 3 also has protrusions 36a that can be oppositely arranged than the protrusions 36b of FIG. 5, i.e. at the side adjacent to the upper base surface 26, and thus lock the insulator disc 40 against movement in an axial upward direction (see also FIG. 4). Overall, the protrusions 36a and 36b can therefore provide a locking in both the upward and downward direction.

Here, the entire surface profile of FIG. 5 includes points of the upper type and can therefore be cast from the upper mold (see the description of FIG. 2). Likewise, in a ring section having the protrusion 36a, the entire inner surface 30 profile includes points of the lower type and can therefore be cast from the lower mold. Thus, it is possible to cast the armature ring 20 of FIGS. 3 to 5 from two molds by a permanent-mold casting process, as described above for the first embodiment.

In the embodiment of FIGS. 3 to 5, the sections having protrusions 36a and 36b can be arranged directly adjacent to each other, with substantially no gap between them. In an alternative embodiment, not shown, there may be small gaps, in a circumferential direction, between at least some of the protrusions 36a and 36b. There can be additional gaps, for example, flat sections, in which the interior surface includes only the recessed portion 32, between at least some protrusion; or there may be no such additional gaps (as in FIG. 3).

Referring back to FIG. 3, a circumferential groove 24 is shown in the upper base surface 26, with thread holes 22 being arranged along the groove 24. A similar groove can also be present in the lower base surface. This groove 24 can also be present in the armature ring of the other embodiments described herein.

FIGS. 6, 7, and 8 show further inner surface 30 profiles of armature rings according to further exemplary embodiments, in respective cross-sectional views corresponding to those of FIG. 2. These embodiments correspond to the embodiment of FIG. 2 except for the differences mentioned below. The embodiment of FIG. 6 is lacking the flat central portion of the protrusion 36. Thus, the protrusion 36 of FIG. 6 only includes inclined side faces but essentially no flat portion which would be parallel to the axis 21. In the embodiment of FIG. 7, the protrusion 36 can have a flat central portion. Further, the side faces of the protrusion 36 can be curved, such that a smooth transition between the protrusion 36 and the recessed portion 32 can be achieved. Further, in the embodiment of FIG. 8, the protrusion 36 can have a convex semicircular shape.

FIGS. 9a and 9b and 10a and 10b show exemplary embodiments corresponding to the embodiment shown in FIGS. 3 to 5 except for the differences mentioned below. Similarly to these embodiments, in FIGS. 9 and 10, the inner armature surface 30 can be divided into two types of sectors, one type of sectors having the respective cross section of FIG. 9a or FIG. 10a, and the other type of sectors having the cross sectional profile of FIG. 9b or 10b, respectively.

The profile shown in FIG. 9a differs from the one shown in FIG. 5 in that the protrusion 36b can have, in the cross sectional profile, only an inclined side face 36b forming an angle between 0° and 90° with the axis 21. The angle can be between 10° and 80° (not including these end values). The inclined side face 36b can be flat but can also be curved, for example, like the upper half of one of FIG. 7 or 8. The profile of FIG. 9a locks the insulator disc against downward movement relative to the armature ring (see the description of FIG. 5). The locking in an upward direction can be provided by profiles of other circumferential sectors. Such a profile is shown in FIG. 9b, with a protrusion 36a being adjacent to the upper base surface 26, and the flat recess portion 32 being adjacent to the lower base surface 28. The FIGS. 9a and 9b illustrate the general aspect that the cross-sectional profiles of different sectors can be mirror-symmetrical to one another about a central plane orthogonal to the ring axis.

FIGS. 10a and 10b show profiles very similar to the profiles of FIGS. 9a and 9b, except that the protrusions 36a and 36b can also include, beside the inclined side faces 34, a flat protruding portion adjacent to the lower or upper base surface, respectively.

Figure 11:
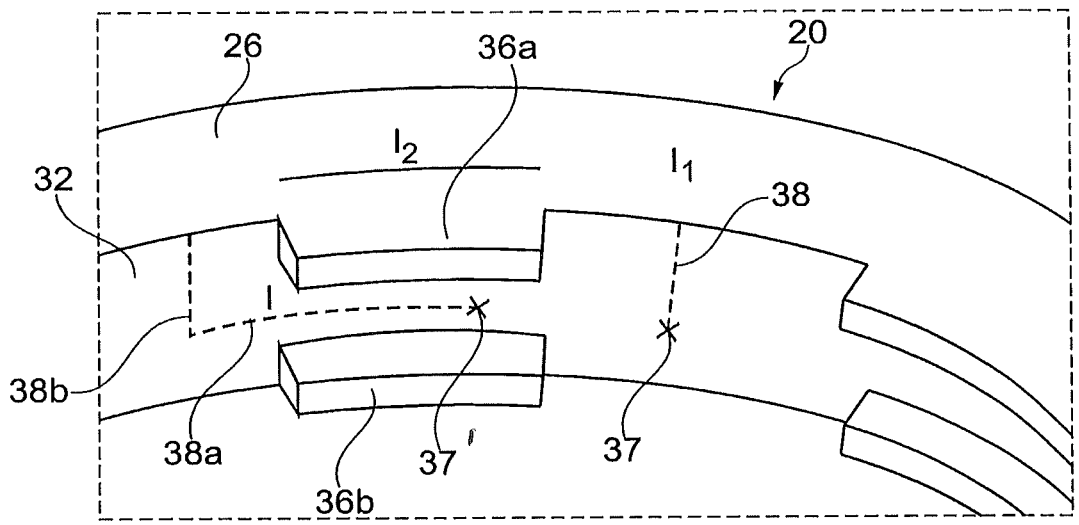
FIG. 11 is a perspective view of a portion of an armature ring of an insulation spacer according to an eighth exemplary embodiment.
Figure 12:
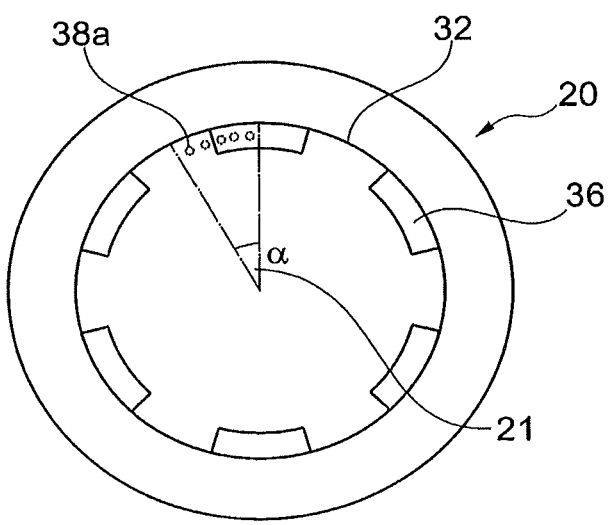
FIG. 12 is a top view of the armature ring of FIG. 11.

FIG. 11 is a perspective view of a portion of an armature 20 of an insulation spacer according to an eighth exemplary embodiment, and FIG. 12 is a top view of the armature 20 of FIG. 11. This embodiment differs from the other embodiments only by the shape of the armature's inner surface 30 (and, consequently, by the inversely-shaped profile at the insulating ring's outer circumference).

As can be seen in FIG. 11, the inner surface 30 has protrusion-free sectors (of length l1 or angle α1 along the circumference) and doubly protruding sectors (of length l2 or angle α2 along the circumference). The protrusion-free sectors have a flat cross-sectional profile that is parallel to the ring axis 21. The doubly protruding sectors have an upper protrusion 36a adjacent to the armature's upper base surface 26, and a lower protrusion 36b adjacent to the armature's lower base surface 28. The protrusions 36a and 36b are shown to have a step-like cross-sectional profile, but they can actually have any profile, for example the profiles of the protrusions shown in FIGS. 1 to 10.

The armature of FIG. 11 can be produced by permanent-mold casting for example, as follows. A first mold and a second mold are provided. The first mold has an inner ring mold surface being the inverse of the protrusion-free sectors, and the second mold has an inner ring mold surface being the inverse of the doubly-protruding sectors. When the armature ring has been cast, it can be demolded by first removing the first mold in, for example, an upward direction. This is possible because the protrusion-free sectors have no inner recess. Then, the armature can be turned relative to the second mold about the ring axis 21, such that the doubly-protruding sectors are removed from the second mold. Then, the armature 20 can be removed from the second mold in an axial direction.

The above permanent-mold production is possible due to at least the following characteristics of the inner surface 30: For any point of the ring inner surface 30, there can be a path along the ring inner surface from this point to the upper ring base surface 26 or to the lower ring base surface, the path being monotonically directed away from the ring axis 21. The path can be, further, a direct path or an indirect path. Here, "direct path" means that the path can be entirely within a cross-sectional plane containing the ring axis 21. "Indirect path" means that the path includes a first path portion of predetermined length l (or, equivalently, a predetermined angular length α about the ring axis 21) in a circumferential direction (i.e. entirely within a plane orthogonal to the ring axis), followed by a second path portion entirely within a cross-sectional plane containing the ring axis. Here, "predetermined length" means that the length is independent of the chosen point.

In the embodiment of FIG. 11, the points 37 of the protrusion-free sectors have a direct path, for example, the direct path 38 shown in FIG. 11. Further, the points 37' of the doubly-protruding sectors have an indirect path. Here, the indirect path includes the first path portion 38a in a circumferential direction (which leaves the doubly-protruding sector), followed by the second path portion 38b (which corresponds to a direct path within the protrusion-free sector). Here, the predetermined length/should be greater than the length l2 of the doubly-protruding sector, l≥l2, because otherwise (if l<l2) the indirect path portion 38a would not leave the doubly-protruding sector for any point therein. For a similar reason, l1≥l. Hence, in the inner surface 30 of FIG. 11, the above-defined characteristics of the inner surface 30 of FIG. 11 imply that l1≥l2 (or, equivalently, if α1≥α2).

FIG. 13 is a perspective view of a portion of an armature ring of an insulation spacer according to a ninth exemplary embodiment. In addition of the elements shown in FIG. 11, the armature ring of FIG. 13 has a through channel 50. The through channel 50 is a through-hole and has an end at the ring inner surface, the end being a mold inlet opening. This mold inlet opening can be used for casting the mold as described further above.

FIGS. 14a and 14b show possible cross-sectional side views of the through-channel 50 (in a cross-sectional plance comprising the ring axis), according to two respective variants. In the variant of FIG. 14a, the through-channel 50 extends through the ring from the ring inner surface to the ring outer surface. The through channel has a channel axis 52 which can be essentially orthogonal to the ring axis. In the variant of FIG. 14b, the through-channel 50 can extend from the ring inner surface to the upper base surface 26 (see FIG. 13). In this variant, the through channel has a channel axis 52 which can be inclined with respect to the ring axis. The through-channel 50 could likewise also extend from the ring inner surface to the lower base surface.

FIG. 13 further shows an optional through channel 51, shaped similarly as the through channel 50 and also ending at the ring inner surface, but with its end at the ring inner surface being a gas outlet opening. As described further above, the gas outlet opening allows for gas to exit the second cavity during molding. While the channels 50 and 51 can be equally dimensioned and shaped in FIG. 13, they may be different, for example, with channel 51 having a smaller channel cross-section than channel 50.

In an exemplary embodiment, a plurality of through channels 50 (mold inlet openings) can be circumferentially arranged along the inner surface of the armature ring 20, and optionally a plurality of through channels 51 (gas outlet openings) can also be circumferentially arranged along the inner surface of the armature ring 20. The channels 50 and 51 can be arranged in circumferentially alternating order.

Alternatively, there can be provided only one through channel 51 (gas outlet openings) at one side of the ring. During molding, the second cavity can be held in an orientation such that the gas outlet openings are in a vertical top position of the second cavity. This facilitates the exiting of gas from the second cavity.

FIGS. 14c and 15 illustrate further possibilities of providing the through channels (applicable both to the mold inlet channel and/or to the optional gas outlet channel). Specifically, instead of being through-holes as in FIG. 13, the through channels can be provided as recesses at the ring upper base 26. The channel may have any channel cross-section, for example, a quadratic cross-section (as in channel 54) or a curved cross-section (as in channel 55). FIG. 14c shows a cross-sectional view of the channel 54. Either both types of channels 54 and 55 can be present, or only one type of channel, 54 or 55, can be present. Either of channels 54 and 55 can be provided, respectively, as mold intake and/or as gas outlet channel. Different types of channels 50, 54, 55 can be provided in the armature. The through channels in FIGS. 13 and 15 are shown with the armature 20 according to the embodiment of FIG. 11. These through channels could likewise also be provided with any of the other armatures described herein.

While the foregoing is directed to embodiments, other and further embodiments may be devised without departing from the basic scope determined by the claims. For example, while the foregoing description has been focused on the case of a gas insulated switchgear, in particular of a high-voltage switchgear, it may also be adapted to other gas insulated devices.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. Insulation spacer for a gas insulated device, comprising:
an insulator disc; and
an armature extending around an outer periphery of the insulator disc and holding the insulator disc, wherein the armature is ring-shaped defining a ring axis and comprises:
two ring base surfaces extending substantially perpendicularly to the ring axis; and
a ring inner surface being arranged between the two ring base surfaces and facing the ring axis, wherein
the ring inner surface includes at least one protrusion directed radially inwardly towards the ring axis, the at least one protrusion being shaped such that it locks the insulator disc in the armature against movement in both directions parallel to the ring axis, and wherein
the ring inner surface including the protrusion is shaped such that for any point of the ring inner surface, there is a path along the ring inner surface from the point to one of the two ring base surfaces, the path being monotonically directed away from the ring axis and being
a direct path entirely within a cross-sectional plane containing the ring axis, or
an indirect path including a first path portion of predetermined length in a circumferential direction, followed by a second path portion entirely within a cross-sectional plane containing the ring axis,
and wherein the ring inner surface is shaped such that the insulator disc is locked in the armature against rotational movement in at least one circumferential direction relative to the ring axis.

2. Insulation spacer according to claim 1, wherein for any point of the ring inner surface the path is a direct path.

3. Insulation spacer according to claim 2, wherein the ring inner surface is shaped such that the insulator disc is locked in the armature against rotational movement in both circumferential directions.

4. Insulation spacer according to claim 2, wherein the insulator disc has an outer surface adjacent to the armature inner surface and shaped substantially as the inverse of the armature inner surface, and wherein the ring inner surface holds the insulator disc by positive fit within the armature.

5. Insulation spacer according to claim 1, wherein the ring inner surface is shaped such that the insulator disc is locked in the armature against rotational movement in both circumferential directions.

6. Insulation spacer according to claim 1, wherein the insulator disc has an outer surface adjacent to the armature inner surface and shaped substantially as the inverse of the armature inner surface, and wherein the ring inner surface holds the insulator disc by positive fit within the armature.

7. Insulation spacer according to claim 1, wherein the protrusion is separated from each of the two ring base surfaces by a respective recessed surface portion arranged between the protrusion and the respective base surface.

8. Insulation spacer according to claim 1, wherein the protrusion extends along a ring segment covering an angle of at least 30° around the ring axis.

9. Insulation spacer according to claim 1, wherein the armature comprises a single-piece ring body extending fully around the outer periphery of the insulator disc.

10. Insulation spacer according to claim 1, wherein the protrusion is adjacent to one of the two ring base surfaces, in an axial direction.

11. Insulation spacer according to claim 1, wherein the gas insulated device is a gas insulated switchgear, such as a high-voltage switchgear.

12. Insulation spacer according to claim 1, wherein the armature comprises at least one through-channel ending at the ring inner surface.

13. Gas insulated device, in particular gas insulated switchgear, comprising an insulation spacer according to claim 1.

14. Insulation spacer for a gas insulated device, comprising:
  an insulator disc and;
  an armature extending around an outer periphery of the insulator disc and holding the insulator disc, wherein the armature is ring-shaped defining a ring axis and comprises:
    two ring base surfaces extending essentially perpendicularly to the ring axis; and
    a ring inner surface being arranged between the two ring base surfaces and facing the ring axis, wherein
  the ring inner surface includes at least one protrusion directed radially inwardly towards the ring axis, the at least one protrusion being shaped such that it locks the insulator disc in the armature against movement in both directions parallel to the ring axis,
  and wherein the ring inner surface including the protrusion is shaped such that any cross-sectional profile of the ring inner surface is substantially free of any inner recess directed radially away from the ring axis,
  and wherein the ring inner surface is shaped such that the insulator disc is locked in the armature against rotational movement in at least one circumferential direction relative to the ring axis.

15. Insulation spacer according to claim 14, wherein the ring inner surface is shaped such that the insulator disc is locked in the armature against rotational movement in both circumferential directions.

16. Insulation spacer according to claim 14, wherein the insulator disc has an outer surface adjacent to the armature inner surface and shaped substantially as the inverse of the armature inner surface, and wherein the ring inner surface holds the insulator disc by positive fit within the armature.

* * * * *